April 28, 1964 W. H. GRIESINGER 3,130,725
LIP AND JAW MOLDING NIPPLE
Filed Aug. 6, 1962 3 Sheets-Sheet 1

INVENTOR.
WALTER H. GRIESINGER
BY
BUCKHORN, CHEATHAM & BLORE
ATTORNEYS

April 28, 1964 W. H. GRIESINGER 3,130,725
LIP AND JAW MOLDING NIPPLE
Filed Aug. 6, 1962 3 Sheets-Sheet 2

*INVENTOR.*
WALTER H. GRIESINGER
BY
BUCKHORN, CHEATHAM & BLORE
ATTORNEYS

April 28, 1964    W. H. GRIESINGER    3,130,725
LIP AND JAW MOLDING NIPPLE

Filed Aug. 6, 1962    3 Sheets-Sheet 3

*INVENTOR.*
WALTER H. GRIESINGER
*BY*
BUCKHORN, CHEATHAM & BLORE
ATTORNEYS

United States Patent Office 3,130,725
Patented Apr. 28, 1964

1

3,130,725
LIP AND JAW MOLDING NIPPLE
Walter H. Griesinger, Weatherly Bldg., Portland 14, Oreg.
Filed Aug. 6, 1962, Ser. No. 215,103
10 Claims. (Cl. 128—252)

This application is a continuation-in-part of my copending application Serial No. 78,433, filed December 27, 1960, for "Lip and Jaw Molding Nipple," now abandoned.

My present invention comprises an improvement in nursing nipples and is designed to prevent or correct malformations of jaw structures by properly molding the lips of jaws of a nursing infant during the early period of the infant's life.

The principal object of the present invention is to provide means in a nursing nipple which will simulate the lip engaging action of the human breast during nursing.

Another object of the invention is to provide a balance against the forward thrust of a baby's tongue against the gums of the baby.

A further object of the present invention is to provide a nursing nipple which will prevent perverse tongue action of a nursing infant, thereby eliminating a cause of jaw malformation.

Another object of the invention is to provide a nursing nipple which supports the lips and gums of a nursing baby from the exterior to balance internal force of the tongue of the baby during sucking and swallowing.

A more particular object of the invention is to provide a nipple having upper and lower lip engaging members or lobes, the nipple being designed so that the nipple folds transversely during use to urge such lobes against the infant's lips. Another object of the invention is to provide a nursing nipple having a pair of opposed hollow lobes, hinge portions to permit the lobes to fold toward each other and a restrictive orifice to slow passage of liquid back out of the nipple when the nipple is compressed to cause pressure of the liquid in the lobes to be higher than would otherwise be the case.

The foregoing and other objects and advantages of the present invention will be readily apparent to those skilled in the art upon inspection of the accompanying drawing, taken in connection with the following specification, wherein like numerals refer to like parts throughout.

2

Figure 13:
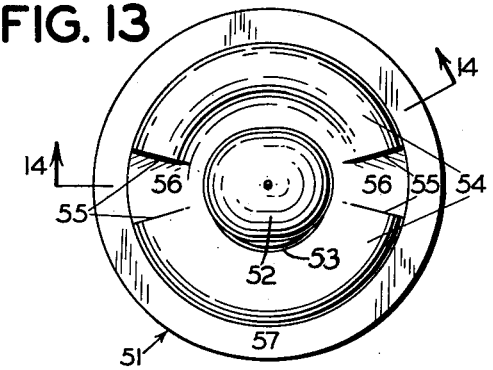
FIG. 13 is a plan view of a nipple forming a further modification of the invention.
Figure 15:
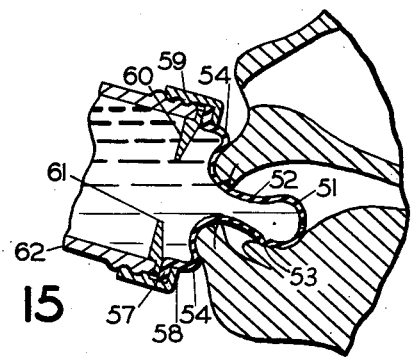
Figure 14:
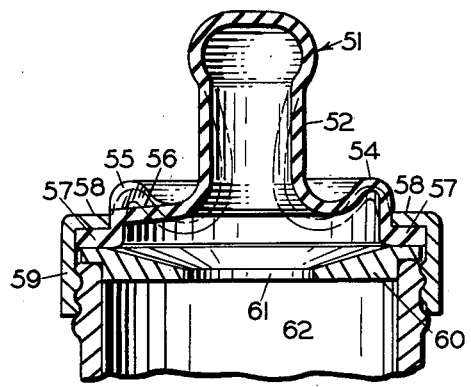
FIG. 14 is an enlarged fragmentary cross-section of the nipple of FIG. 13 on a nursing bottle.
Figure 16:
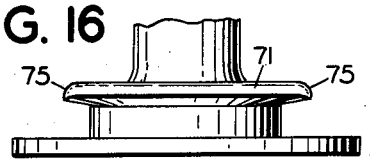
Figure 18:
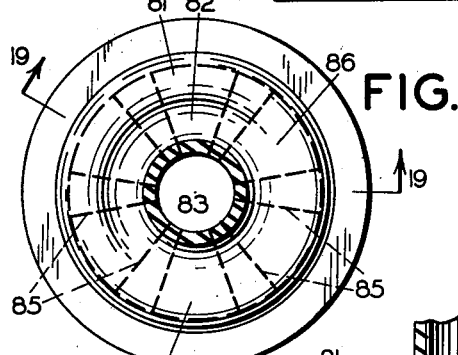
Figure 19:
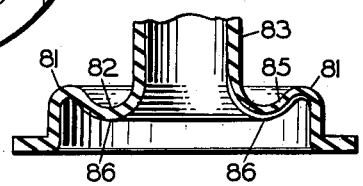
Figure 17:
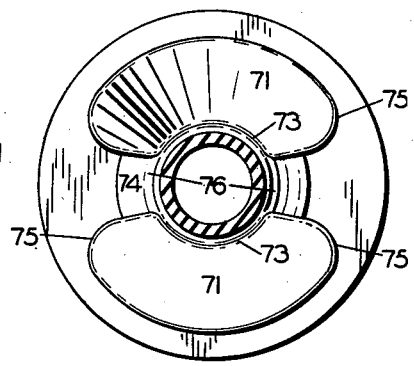

FIG. 15 is a cross-section of the nipple of FIGS. 13 and 14 during use;

FIG. 16 is a fragmentary elevation view of a nipple forming a further modification of the invention;

FIG. 17 is a partially sectional view of the nipple of FIG. 16;

FIG. 18 is a plan view of a nipple forming a further embodiment of the invention; and FIG. 19 is a vertical section taken along line 19—19 of FIG. 18.

The nursing nipple disclosed in FIGS. 1 to 4 inclusive comprises a breast portion 10 and an integral teat portion 11 extending coaxially forward from the breast portion. The teat portion 11 is provided with an oblate tip 12 having a thickened transverse bar 13 across the front thereof, and is provided with milk emitting perforations 14 in the usual manner. An air vent 15 is provided in the side of the teat portion below the transverse bar. The lower edge of the breast portion 10 is provided with an internal annular flange 16 for engagement with a retaining flange on a nursing bottle, and a tab 17 extends outwardly from the lower edge to indicate the position of the bar 13 and the vent 15 in the infant's mouth. The nipple as so far described in disclosed and claimed in my prior Patent No. 2,537,583 issued January 9, 1951, and is designed to be used with the transverse bar 13 engaging the lower jaw of the infant for the purposes set forth in said patent.

Figure 1:
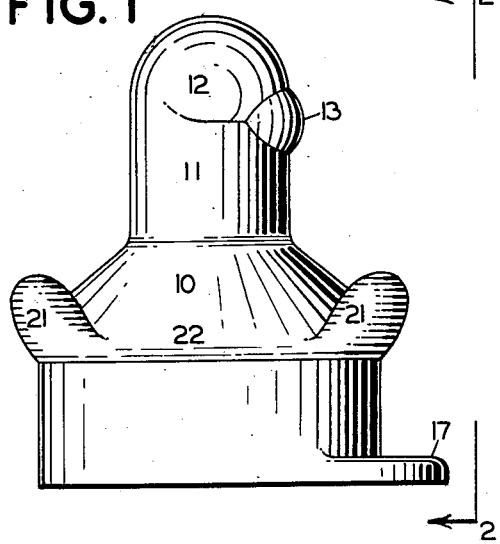
FIG. 1 is a side elevation of a nursing nipple formed in accordance with my present invention.
Figure 4:
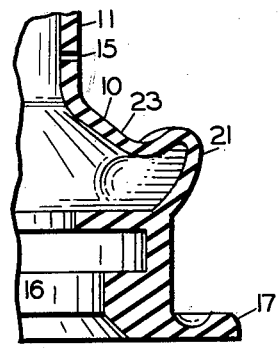
FIG. 4 is a partial vertical section taken along line 4—4 of FIG. 3.
Figure 2:
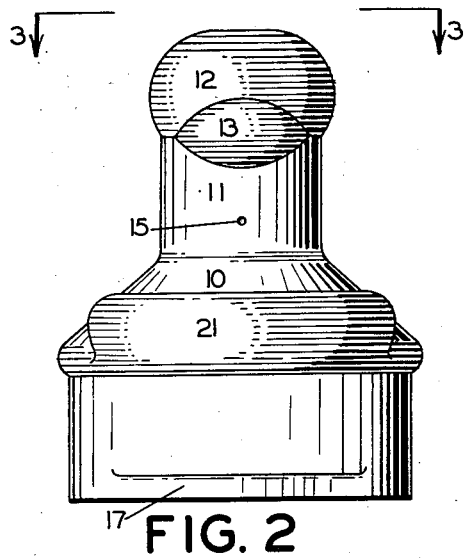
FIG. 2 is a view taken along line 2—2 of FIG. 1.
Figure 3:
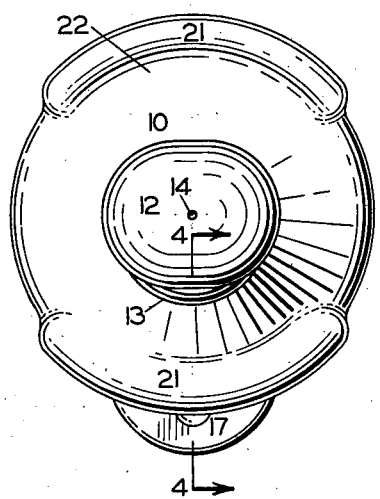
FIG. 3 is a view taken along line 3—3 of FIG. 2.
Figure 5:
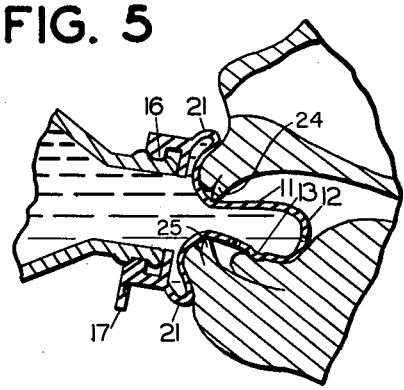
FIG. 5 is a cross-section of the nipple of FIG. 1 during use.

In accordance with the present invention the breast portion is provided with high, hollow, arcuate lobes or lips 21 projecting outwardly and forwardly from the breast portion beneath the junction therewith of the teat portion each being slightly less than semi-circular in extent. The walls of the lobes are flexible and preferably are not greater than .040 inch in thickness. The oppositely disposed high lobes 21 are separated by low portions 22. The external surfaces of junction portions 23 between the lobes 21 and the teat portion are concave. The high lobes 21 are symmetrical with respect to the bar 13, being coextensive in width with said breast portion, being centered symmetrically with respect to a vertical section through the center of the bar 13, and lying in front of and behind the teat portion so as to overhang or envelope the lips of the nursing infant, the corners of the infant's mouth being adjacent the low portions 22 when the nipple is properly used. It should be noted (see FIG. 5) that the lobes engage and press against the outer surfaces of the lips above and below the edge surfaces of the lips as well as against the edge surfaces of the lips. The nipple is formed of the usual resilient material, and has flexible thin-walled breast and teat portions. During nursing, the gums 24 and 25 of the baby press against portions of the teat portion which are on opposite sides thereof and which are substantially aligned with the central portions of the lobes 21. As is apparent the lobes 21 stiffen the breast portion slightly through their extent whereas the areas 22 are of greater flexibility such as to permit easy folding of the lobes 21 toward each other as the infant makes the bite as the infant is sucking. In effect, the areas 22 act as a transverse hinge or fold portion to provide a hinge or fold axis extending across the baby's mouth and across the nipple between the ends of the lobes 21. As the lobes 21 are folded toward each other, they envelope both of the baby's lips and form the lips correctly, and also, since they are thin-walled and flexible, are urged by pressure of the milk in the nipple to urge the baby's lips to the desired positions and shapes. The lobes 21 engage and mold the nursing infant's lips, hence press against and mold the infant's jaws in substantially the manner that the human breast acts upon a suckling infant. This pressure also balances forward pressure of the tongue against the gums, thereby preventing outward deformation of the gums, and also facilitates thrusting the milk back into the pharynx by supporting the upper gum. The jaws and gums of the infant are thereby massaged and pressed into proper formation, resulting in the formation of correct jaw and tooth structure at a later age. The lobes stimulate tonacity (muscle tone) of the lips for correct breathing and lip closure, preventing perverse and harmful action of the tongue.

Figure 6:
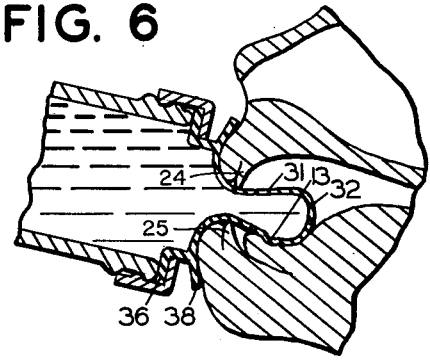
FIG. 6 is a cross-section of a modified form of the present invention during use.
Figure 7:
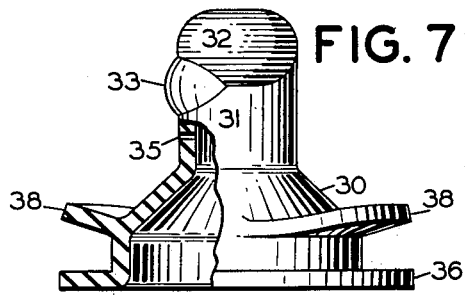
FIG. 7 is a side elevation, partially in section, of the nipple of FIG. 6.
Figure 8:
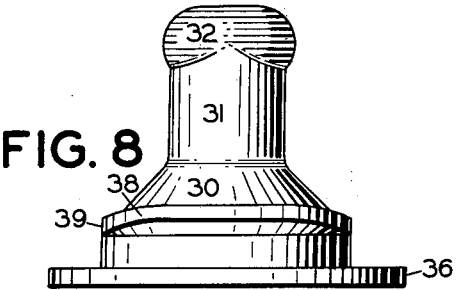
FIG. 8 is a side elevation view of the nipple of FIG. 6.
Figure 9:
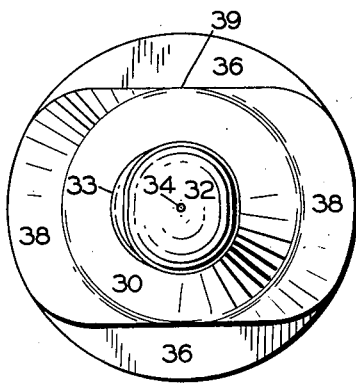
FIG. 9 is a plan view of FIG. 7.

The form of the invention illustrated in FIGS. 6, 7, 8 and 9 comprises a breast portion 30 having an integral, coaxially extending teat portion 31, the teat portion being provided with an oblate tip 32, a transverse bar 33, a milk emitting opening 34 and a vent opening 35 as described and claimed in the above-identified patent. This form of nipple is adapted to be mounted upon a wide-mouth nursing bottle, and for this purpose is provided with an external peripheral flange 36 at its lower end which is adapted to rest upon the rim of the bottle and to be clamped in place thereon by an internally flanged screw cap. This form of nipple is provided with a pair of flange-like high lobes 38 lying on opposite sides of the teat portion and substantially coextensive in width with the breast portion, being symmetrically disposed with respect to the center of the bar 33 and the vent opening 35 so as to engage the upper and lower lips of the infant, and extending upwardly and outwardly from the breast portion. The high lobes merge into low portions 39, the centers of which are substantially at the transverse axis of the nipple so as to lie opposite the corners of the mouth during nursing and form a weakened or easily folded portion. The thickness of the lobes 38 is substantially equal to the thickness of the walls of the teat and breast portions and is such as to make the lobe walls quite flexible. The lobes lie at the base of the breast portion which is closely adjacent the base of the flange 36 so that the inner edge of the rim of the screw cap supports and prevents inward depression of the bases of the lobes. The breast portion is relatively low and wide, so that the lips of the infant will be engaged by the upper surfaces of the flexible high lobes 38, as shown in FIG. 6. As a result, when a nursing infant presses inwardly on the breast portion and bites the teat portion during the normal action of nursing, the flexible high lobes 38 are caused to fold and curl upwardly and inwardly to press against and around and mold the lips and the underlying jaws and gums of the infant, yet the action is so gentle that harmful pressure would not be applied.

Figure 10:
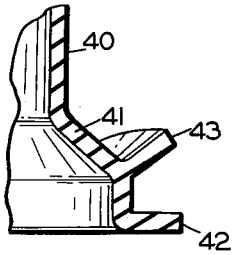
FIG. 10 is a partial vertical section of a further modification of the invention.

FIG. 10 illustrates a nipple of the type described and more fully illustrated in FIGS. 6, 7, 8 and 9 and comprises a teat portion 40, a breast portion 41, a screw cap engaging flange 42 and flexible lip engaging and molding lobes 43. In this form the lobes 43 extend upwardly at a greater angle with respect to the horizontal than the lobes 38, a condition which may be more desirable for certain infants.

Figure 11:
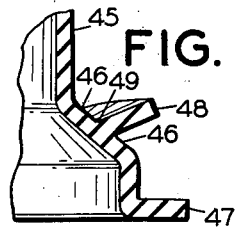
FIG. 11 is a partial vertical section of a further modification of the invention.
Figure 12:
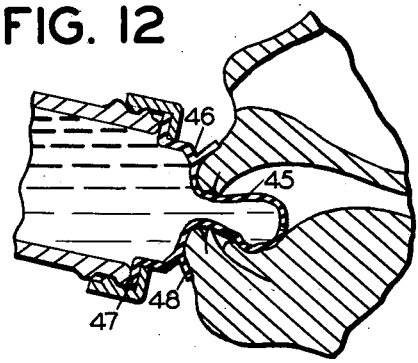
FIG. 12 is a cross-section of the nipple of FIG. 11 during use.

FIGS. 11 and 12 illustrate a similar nipple having a teat portion 45, a breast portion 46, a cap engaging flange 47 and lip engaging and molding lobes 48 substantially as described and illustrated in regard to FIGS. 6, 7, 8 and 9, but in which the base of the lip engaging lobe is located at an intermediate point of the breast portion, for example half way between the base of the teat portion and the shoulder of the breast portioin, and junction portions 49 are concave externally.

A nipple 51 shown in FIGS. 13, 14 and 15 forming a further modification of the invention is similar to that shown in FIGS. 1 to 5 except as is brought out hereinbelow. The nipple has a teat portion 52 provided with a bar 53 and two opposed, hollow, rounded, lip-enveloping ribs or lobes 54 on a breast portion 50 whose ends 55 are separated by substantially flat, highly flexible hinge or fold portions 56. The ends 55 are substantially normal to the arcuate longitudinal axes of the arcuate lobes so that the flat portions 56 therebetween are, in effect, weakened to facilitate the folding action. The nipple 51 has a base flange 57 adapted to be pressed by flange 58 of a known cap 59. The nipple 51 is highly corrective by itself, and the corrective action may be enhanced when the nipple is used with a restricted orifice plate 60. The orifice plate 60 has a restricted orifice or aperture 61 therein of a size such as to restrict flow of milk back into bottle 62 when the baby bites on the nipple to compress it. This causes the pressure of the portion of the milk in the nipple to increase during the bite and swallow, and the increased pressure of the milk in the nipple increases the pressing action of the ribs 54 on the baby's lips and gums.

The nipple of FIGS. 16 and 17 forming a further modification of the invention is generally similar to that shown in FIG. 11 with the difference of the wings or lobes 71 joining the nipple proper substantially at the junction of transition portion 73 and breast portion 74. The wings 71 also have lateral projections 75 abutting easily folded or weakened portions 76 of the nipple between the ends of the wings, that is, where the wings are not present. This gives even more flexibility of the weakened portions 76 than in the corresponding weakened portions of the nipple of FIG. 11. This also gives greater hydraulic support.

The nipple of FIGS. 18 and 19 is generally similar to the nipple of FIGS. 13, 14 and 15 but has a continuous flexible rib 81 forming a portion of the breast portion 82. This nipple also has a teat portion 83. The nipple of FIGS. 18 and 19 has a large number of thin-walled or weakened, highly flexible portions 85 arranged in diametrically opposed positions so that a natural fold line extending across the mouth is provided regardless of the rotative position of the bottle in the baby's mouth. Thicker portions 86, still flexible, are positioned between the thinner portions 85 to give, with the compound curve of the rib and the hydraulic pressure, sufficient stiffness to give the desired pressing action on the lip portions and gums of the baby.

Having illustrated and disclosed preferred forms of my invention, it should be apparent to those skilled in the art that the same permits of further modifications in arrangement and detail. I claim as my invention all such modifications as come within the true spirit and scope of the following claims.

I claim:
1. In a nursing nipple,
   a teat portion of a predetermined diameter at the inner end thereof,
   a breast portion,
   and a pair of oppositely disposed hollow lobe portions spaced radially outwardly from and extending arcuately around and along the breast portion and communicating with the interior of the nipple so as to be filled with milk,
   the lobe portion and the breast portion serving to define fold areas extending along a line extending across the nipple and between the lobe portions.
2. The nursing nipple of claim 1 wherein the breast portion is exteriorly concave.
3. The nursing nipple of claim 1 wherein the breast portion is exteriorly convex.
4. In a nursing nipple,
   a teat portion of a predetermined diameter at the inner end thereof,
   a breast portion,
   and a pair of hollow ribs spaced radially outwardly from and extending arcuately around and along the breast portion and communicating with the interior of the nipple so as to be filled with milk,
   the arcuate ribs being positioned at opposite sides of the breast portion and each being slightly less than semi-circular in extent,
   the ribs and the breast portion serving to define fold areas extending along a line extending across the nipple between the ribs.
5. The nursing nipple of claim 4 wherein the ribs are arcuate in transverse cross-section.

6. In a nursing nipple,
a teat portion of a predetermined diameter,
and a breast portion having an open end of a diameter substantially larger than that of the teat portion,
the breast portion having a wall of substantially uniform thickness throughout,
the wall of the breast portion being tapered to blend with the teat portion and being formed into opposed, hollow lobe portions opening unobstructedly into the interior of the nipple,
the lobe portions extending arcuately around opposite sides of the nipple with the ends of the lobe portions spaced from each other to define easily foldable hinge portions separating the lobe portions,
the lobe portions being curved in transverse cross-section to resist folding.

7. In a nursing nipple formed of a resilient, flexible material:
a teat portion,
a breast portion,
and a pair of lip enveloping lobes on said breast portion disposed diametrically of one another and projecting outwardly of said breast portion and stiffening the breast portion through the extent of said lobes,
each of said lobes being slightly less than semicircular in extent so that the adjacent ends of the lobes are spaced a slight distance from one another,
the wall of said breast portion between the adjacent pairs of ends of said members defining a fold area of greater flexibility than said lobes extending along a line extending transversely of the nipple within the spaces between said adjacent lobe ends so that when the nipple is positioned in an infant's mouth with said lobes overlying the lips, biting of the nipple by the infant will cause the nipple to fold along said line to cause said lobes to press against the lips of the infant.

8. In a nursing nipple,
a flexible teat portion,
a breast portion,
and a pair of oppositely disposed, separate, lip-enveloping, hollow lobes projecting along and outwardly from the breast portion on opposite sides of the breast portion, said hollow lobes communicating with the interior of the nipple,
said hollow lobes being each slightly less than semicircular in extent and stiffening the breast portion through their extent,
said breast portion defining fold areas of greater flexibility than said lobes between the ends of said lobes so that, with the nipple positioned within an infant's mouth with the lobes overlying the lips of such infant, the pressure of the infant's bite on said nipple will cause the same to fold transversely along said fold areas so as to press said lobes against said lips.

9. In a nursing nipple,
a teat portion,
and a breast portion having a continuous, annular, hollow rib,
the rib and breast portion being provided with a plurality of diametrically opposed pairs of thin-walled foldable portions of a predetermined flexibility spaced circumferentially therearound and also having a plurality of strong, thicker walled portions of less flexibility than said foldable portions positioned circumferentially between the foldable portions.

10. In a nursing structure,
a generally cylindrical flexible teat portion of a predetermined diameter,
a base flange,
a breast portion extending between the base flange and the teat portion,
a pair of flexible hollow lobe portions each slightly less than semi-circular in extent and joined to opposite sides of the breast portion and communicating with the interior of the breast portion and adapted to overhang and press against the lips of a baby,
the ends of the lobe portions being separated to define with the portions of the breast portions between the ends of the lobe portions easily foldable hinge portions separating the lobe portions,
and a restrictive orifice member abutting the base flange and partially closing the interior chamber defined by the teat, breast and lobe portions for maintaining pressure of milk in the chamber.

References Cited in the file of this patent
UNITED STATES PATENTS

| | | |
|---|---|---|
| 1,656,157 | Correnti | Jan. 17, 1928 |
| 1,759,568 | Fervers | May 20, 1930 |
| 2,537,583 | Griesinger | Jan. 9, 1951 |
| 2,803,250 | Barr | Aug. 20, 1957 |
| 2,803,365 | Allen | Aug. 20, 1957 |

FOREIGN PATENTS

| | | |
|---|---|---|
| 729,690 | Germany | Dec. 21, 1942 |
| 714,722 | Great Britain | Sept. 1, 1954 |